United States Patent [19]

Ahmad

[11] 4,278,045
[45] Jul. 14, 1981

[54] DISPENSING FOAMABLE MATERIAL

[75] Inventor: Abu Ahmad, Newark, Ohio

[73] Assignee: Owens-Corning Fiberglas Corporation, Toledo, Ohio

[21] Appl. No.: 6,953

[22] Filed: Jan. 25, 1979
(Under 37 CFR 1.47)

[51] Int. Cl.³ .................... B05B 1/04; B05B 1/14
[52] U.S. Cl. .................... 118/323; 118/314; 118/325; 239/186; 239/187; 239/558; 239/560; 427/286; 427/424
[58] Field of Search ............ 239/186, 187, 558, 560, 239/561, 566; 425/817 C, 375; 118/323, 314, 315, 325; 427/286, 424

[56] References Cited

U.S. PATENT DOCUMENTS

| | | | |
|---|---|---|---|
| 580,074 | 4/1897 | Williams | 239/566 |
| 1,401,911 | 12/1921 | Keller | 239/566 X |
| 1,529,531 | 3/1925 | Young | 239/186 |
| 2,302,857 | 11/1942 | Harder | 118/315 X |
| 2,663,591 | 12/1953 | Pew | 239/186 |
| 2,726,632 | 12/1955 | Asbeck et al. | 239/566 |
| 2,914,258 | 11/1959 | Ruetsch | 239/186 |
| 2,933,259 | 4/1960 | Raskin | 239/186 |
| 3,009,209 | 11/1961 | Weinbrenner et al. | 118/323 X |
| 3,155,540 | 11/1964 | Loeffler et al. | 118/323 X |
| 3,185,129 | 5/1965 | Sollich | 118/323 X |
| 3,705,821 | 12/1972 | Breer et al. | 118/323 X |
| 3,824,950 | 7/1974 | Woody | 118/323 X |
| 3,927,162 | 12/1975 | Stahter | 264/51 |
| 4,051,209 | 9/1977 | Tabler | 425/375 X |
| 4,073,839 | 2/1978 | Burkholder et al. | 264/45.1 |

Primary Examiner—Shrive P. Beck
Attorney, Agent, or Firm—Ronald C. Hudgens; Philip R. Cloutier; Ted C. Gillespie

[57] ABSTRACT

A dispensing cone for dispensing foamable material onto a moving surface comprises a chamber having a plurality of discharge ports which are generally cylindrical and have nonparallel longitudinal axes. The discharge ports are generally coplanar in a plane generally parallel to the direction of movement of the moving surface. The discharge cone can be oscillated across the width of the moving surface.

3 Claims, 4 Drawing Figures

DISPENSING FOAMABLE MATERIAL

This invention relates to the dispensing of liquid material.

In one of its more specific aspects this invention relates to dispensing foamable material onto a moving collecting surface.

In the field of dispensing foamable material, one present practice includes the dispensing of foamable material by means of one or more nozzles which distributes the foamable material in a generally radial spray pattern. Another foam dispensing method is that of dispensing the foamable material from a slit in the bottom of a dispensing cone positioned beneath a mixing head. It is also known in the art that advantages are to be gained by oscillating a foam dispensing apparatus across the width of a collecting surface in instances where the foam is to be disposited on a moving collecting surface. In such instances, the foamable material is disposited in a zig zag or "Z" fashion on the collecting surface. In systems in which the collecting surface travels at a high rate of speed, large amounts of foam are dispensed in the zig zag fashion and the foam is required to do a considerable amount of traveling in order to fill up the voids or empty spaces between the "Z" lines.

One of the problems associated with existing foam dispensing systems is that as collecting surface speeds are increased the "Z" lines become spread out and, consequently, the foaming material on the collecting surface is required to travel farther and farther to fill up the empty spaces in between the "Z" lines. In some cases, the "Z" lines are spaced so far apart that the foam begins to cure before the empty spaces are filled, and knit lines are formed. These knit lines are undesirable in the finished product from both a structural and an appearance standpoint. Another problem associated with existing foam dispensing systems, especially where the foam dispenser comprises a dispensing cone having a slit for distributing a fan-like spray of foamable material, is that the foamable material has a tendency to partially cure inside the dispensing cone, thereby clogging the narrow slit in the cone. The present invention is directed toward the solution of these problems.

According to this invention, there is provided apparatus including a moving surface for receiving foamable material, a chamber for dispensing foamable material, a plurality of discharge ports positioned through the walls of the chamber, the discharge ports being conduits having nonparallel longitudinal axes, and the discharge ports being generally coplanar in a plane generally parallel to the direction of movement of the moving surface, and means for oscillating the chamber across the width of the moving surface. The chamber can be a dispensing cone with at least one of the discharge ports positioned at the apex of the dispensing cone and the other discharge ports being positioned on the sides of the dispensing cone. The discharge ports can be generally cylindrical.

According to this invention, there is also provided a method comprising positioning a dispensing chamber above a moving collecting surface, dispensing foamable material from the dispensing chamber in the form of a plurality of distinct streams, the streams being directed so that the intersections of the streams with the collecting surface are colinear along a line in the direction of movement of the collecting surface. The chamber can be oscillated across the width of the collecting surface. The distinct streams can be directed in nonparallel directions through discharge ports in the dispensing chamber.

The invention will be more easily understood when explained in conjunction with the attached drawings.

Figure 2:
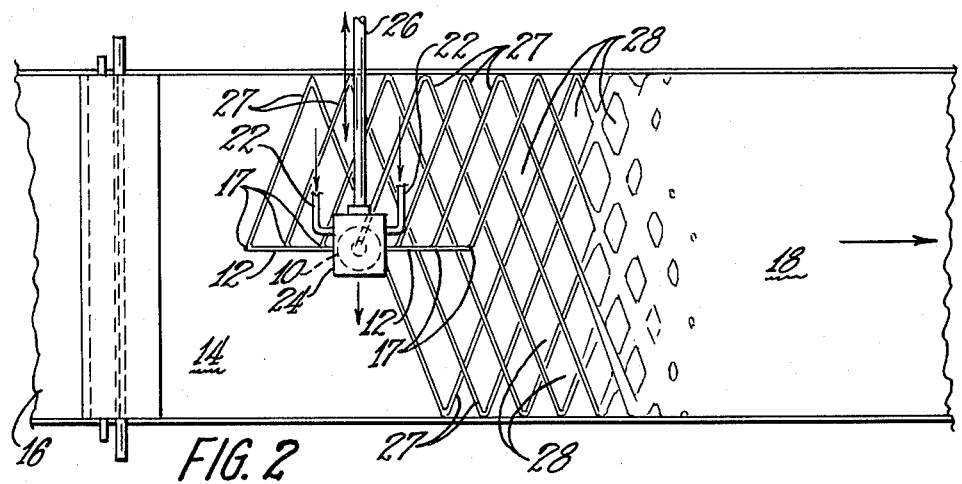
FIG. 2 is a plan view of the dispensing system of FIG. 1.
Figure 1:
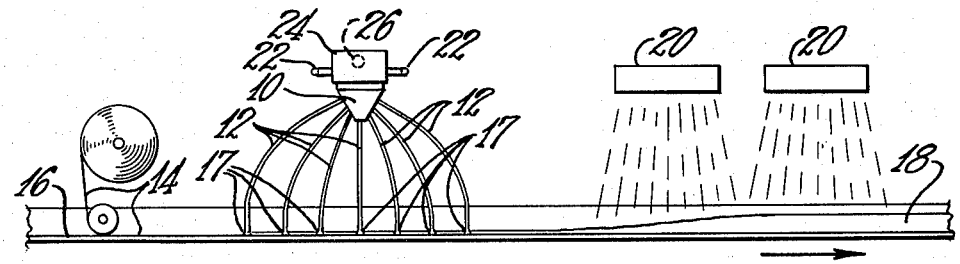
FIG. 1 is an elevational view of the dispensing system according to the principles of this invention.

In FIGS. 1 and 2 there is shown dispensing cone 10 which dispenses streams 12 of foamable material. Any number of streams would be suitable for purposes of the invention, although in the preferred embodiment seven streams are dispensed. The streams are received by collecting surface 14 which is laid on conveyor 16 traveling in the direction of the arrow. The collecting surface can be a thin fibrous web such as a thin mat of glass fibers. The collecting surface can also be a relatively rigid fibrous substrate such as a fiber glass board having a density of about 37 kilograms per cubic meter. As shown in FIG. 2, the intersections 17 of the seven streams with the collecting surface are all colinear along a line in the direction of movement of the collecting surface. Upon reaching the collecting surface, the foamable material begins to cream to form foam body 18. The curing of the foam can be facilitated by positioning heaters 20 above the creaming foam.

Supply lines 22 deliver the components of the foamable mixture from sources, not shown, to mixing head 24. Any suitable mixing head can be used, although in the preferred embodiment a Martin & Sweets mixing head No. 4 is used. The mixing head is mounted on traversing means 26 for oscillating across the width of the moving collecting surface, as shown schematically in FIGS. 1 and 2. The dispensing cone is mounted from the mixing head in order to distribute the foamable material coming from the mixing head.

The oscillation of the mixing head and the mixing cone across the width of the collecting surface moves the seven streams of foamable material from side to side of the collecting surface. This oscillating of the seven streams of foamable material onto the collecting surface, in conjunction with the movement of the collecting surface itself, creates an overlapping of seven "Z" patterns 27. The overlapping of the seven "Z" patterns results in only relatively small diamond-shaped empty spaces 28 in the foamable material on the collecting surface. Since the foaming material on the collecting surface only has to travel short distances to fill up the empty spaces, there will be no knit lines in the finished foam body. Also, it can be seen that the oscillation of the dispensing cone across the width of the collecting surface results in all seven of the streams of foamable material reaching the sides of the collecting surface. This assures even distribution of the foamable material across the width of the collecting surface.

Figure 4:
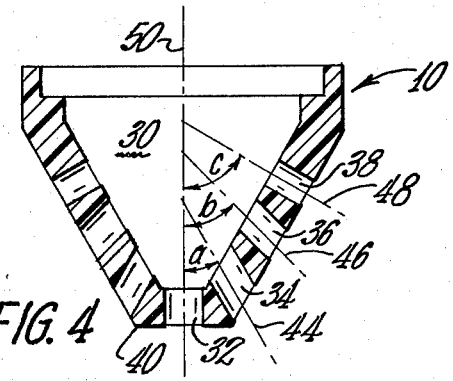
FIG. 4 is a sectional view of the dispensing cone taken along line 4—4 of FIG. 3.
Figure 3:
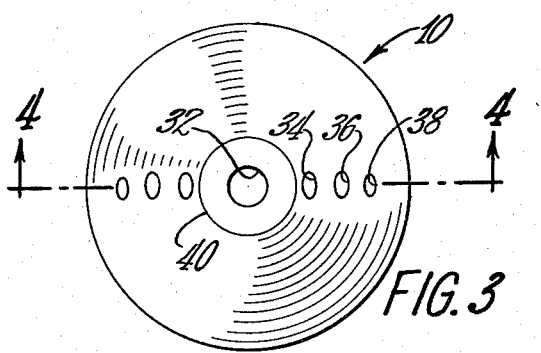
FIG. 3 is a plan view of a dispensing cone according to the principles of the invention.

As shown in FIGS. 3 and 4, the dispensing cone is comprised of chamber 30 having a plurality of discharge ports 34, 36 and 38 positioned through the walls of the discharge chamber, with discharge port 32 positioned through apex 40 of the dispensing cone. The discharge ports are conduits which can be of any suitable cross section, although the discharge ports of the preferred embodiment are cylindrical. The discharge ports can be of any suitable diameter, although in the preferred embodiment the discharge ports which are closest to the apex are the largest. The diameters of the discharge ports will necessarily be a function of the viscosity of the foamable mixture.

Longitudinal axes 44, 46 and 48 of discharge ports 34, 36 and 38, respectively, form unequal angles a, b, and c with vertical center line 50. The discharge ports, therefore, have nonparallel longitudinal axes, since not all of the longitudinal axes of the discharge ports are parallel to each other. The orientation of the longitudinal axes of the various discharge ports with respect to the vertical center line enables the streams of foamable material to be directed so that the proper separation of the streams is maintained.

All of the discharge ports are generally coplanar in a plane which is generally parallel to the direction of movement of the collecting surface. In the preferred embodiment, the foamable material streams themselves all lie within this plane.

It can be appreciated, in view of the above, that various modifications can be made to this invention. All such variations are intended to be encompassed, however, by the claims herein.

I claim:

1. Apparatus comprising:
   a. a moving surface for receiving foamable material;
   b. a chamber for dispensing said foamable material;
   c. a plurality of discharge ports positioned through the walls of said chamber, said discharge ports:
      (1) being conduits having nonparallel longitudinal axes; and,
      (2) being generally coplanar in a plane generally parallel to the direction of movement of said moving surface; and,
      (3) having longitudinal axes oriented at different angles with respect to the vertical center line of said chamber so that the streams discharged from said discharge ports are nonintersecting; and,
   d. means for oscillating said chamber across the width of said moving surface.

2. The apparatus of claim 1 in which said chamber comprises a dispensing cone, at least one of said discharge ports being positioned at the apex of said dispensing cone, the other discharge ports being positioned on the sides of said discharge cone.

3. The apparatus of claim 2 in which said discharge ports are generally cylindrical.

* * * * *